United States Patent
Valdes (10) Patent No.: US 9,580,032 B1
(45) Date of Patent: Feb. 28, 2017

(54) IMPACT ABSORPTION CUSHION

(71) Applicant: Carlos E. Valdes, Orange, CA (US)

(72) Inventor: Carlos E. Valdes, Orange, CA (US)

( * ) Notice: Subject to any disclaimer, the term of this patent is extended or adjusted under 35 U.S.C. 154(b) by 0 days.

(21) Appl. No.: 15/350,700

(22) Filed: Nov. 14, 2016

(51) Int. Cl.
  *B60R 21/02* (2006.01)
  *F16F 1/373* (2006.01)
  *B60R 21/00* (2006.01)

(52) U.S. Cl.
  CPC .......... *B60R 21/026* (2013.01); *F16F 1/3737* (2013.01); *B60R 2021/0006* (2013.01); *B60R 2021/0266* (2013.01); *B60R 2021/0293* (2013.01)

(58) Field of Classification Search
  CPC .......... B60R 21/026; B60R 2021/0266; B60R 2021/0293; B60R 2021/0006; F16F 1/3737
  USPC ................................................. 188/371, 372
  See application file for complete search history.

(56) References Cited

U.S. PATENT DOCUMENTS

| 2,560,009 A | 7/1951 | Straith |
| 2,626,163 A | 1/1953 | Scantlebury |
| 2,760,788 A | 8/1956 | Segall |
| 2,820,648 A | 1/1958 | Wanzenberg |
| 3,989,275 A | 11/1976 | Finch et al. |
| 4,147,828 A | 4/1979 | Heckel et al. |
| 4,252,341 A | 2/1981 | Barecki et al. |
| 5,251,931 A * | 10/1993 | Semchena ............ B60R 21/207 280/730.1 |
| 5,746,443 A * | 5/1998 | Townsend ................. B60J 5/06 280/728.2 |
| 5,911,434 A * | 6/1999 | Townsend ................. B60J 5/06 280/728.2 |
| 5,971,487 A * | 10/1999 | Passehl .................... B60N 2/28 108/44 |
| 6,260,903 B1 * | 7/2001 | von der Heyde .... B60N 2/2821 296/24.46 |
| 6,769,725 B2 | 8/2004 | Ko |
| 7,219,957 B1 * | 5/2007 | Khouri ................. B60N 2/4235 297/216.1 |
| 8,215,693 B2 * | 7/2012 | Ulita ........................ B60R 5/04 296/37.1 |
| 8,804,321 B2 * | 8/2014 | Kincaid ............... F16M 11/046 248/231.41 |
| 9,511,700 B1 * | 12/2016 | Blackwell ............. B60N 3/001 |

* cited by examiner

*Primary Examiner* — Thomas Irvin
(74) *Attorney, Agent, or Firm* — Robert C. Montgomery; Montgomery Patent & Design LP.

(57) ABSTRACT

An impact absorption device configured for use in a vehicle includes a barrier and a base capable of removably securing a barrier at a right angle. The barrier is composed of an impact reducing material. The base is configured to rest beneath a vehicle safety seat or safety seat cradle. The barrier is capable of vertical adjustment relative to the base.

20 Claims, 9 Drawing Sheets

IMPACT ABSORPTION CUSHION

RELATED APPLICATIONS

The present invention is a continuation of, was first described in, and claims the benefit of U.S. Provisional Application No. 62/184,360 filed Nov. 11, 2015, the entire disclosures of which are incorporated herein by reference.

FIELD OF THE INVENTION

The invention relates generally to an impact absorption cushion configured to rest beneath an automobile safety seat or safety seat cradle.

BACKGROUND OF THE INVENTION

Motor vehicle safety is takes the highest priority in motor vehicle design. Thanks to efforts undertaken by motor vehicle manufacturers, more people walk away from motor vehicle accidents than ever before. Recent technological advances such as automatic seat belts, accident avoidance systems, driver alert systems, anti-lock braking, and the like all play an important part in keeping drivers and passengers safe. Another safety device, typically deployed as a last-ditch effort is that of the air bag. While such devices do a great service for front seat passengers, occupants in rear seats often do not fair so lucky. Side air bags help somewhat, but are often too high in the vehicle to do any real good. Children in rear seats of passenger vehicles are thus vulnerable to great injury during a side impact from another vehicle, as existing devices do not adequately protect children seated in the rear of passenger vehicles from severe injury during a side impact of another vehicle. Accordingly, there exists a need for a means by which rear seat occupants in a motor vehicle can be protected safely during an accident. The development of the impact absorption device for motor vehicle rear seat occupants fulfills this need.

None of the above inventions and patents, taken either singly or in combination, is seen to describe the invention as claimed. Thus, a need exists for a reliable, safe, impact absorption cushion capable of being placed under a child's automobile seat, or safety seat cradle and to avoid the above-mentioned problems.

SUMMARY OF THE INVENTION

It is therefore an object of the present invention to provide such an impact absorption device, which includes a base, having a planar portion, a transition portion having a first end continuous with and curving away from a rear of the planar portion, and an insert portion extending vertically away from a second end of the transition portion, thereon, and a barrier, comprising a double-layered core capable of absorbing an impact and rebounding to maintain its original shape, further having a first barrier side, a second barrier side, a top side, and a bottom side having a slot removably receiving the insert portion and adjustably attached to the insert portion via a fastening means. The fastening means is capable of providing vertical adjustment of the barrier relative to the insert portion. When the planar portion is placed on a seat of a vehicle, a safety seat can be placed on the base to provide structural support. When the barrier is attached to the base, the barrier can provide side impact absorption. In some embodiments, the barrier can be vertically adjusted to a height of the normal seat occupier. In other embodiments, the barrier van be vertically adjusted to a top of the window frame of the vehicle door.

An object of the present invention is to provide such a pair of tracks vertically oriented and located on a rear face of the insert portion of the base. A pair of rails, each vertically oriented and each located on a rear inner face of the slot of the barrier each slidably engages an individual one (1) of the pair of tracks. The pair of tracks are equidistant from a bisecting axial centerline of the insert portion and the pair of rails are similarly spaced thereapart.

Another object of the present invention is to provide such a fastening means including a spring-loaded pin extending through a from wall of the barrier such that a handle portion is outside the front wall and the pin portion resides within the slot. The pin portion is capable of engaging one (1) of a plurality of apertures located within the insert portion. The plurality of apertures is aligned along the bisecting axial centerline of the insert portion. The pin is preferably spring-loaded to bias the pin portion into the slot. A stop is located within the slot and encircles the pin such that it cannot be removed from the barrier.

A further object of the present invention is to provide such a transition portion being a generally arcuate member and having a grip continuous with and coextensive with a rear surface of the second end thereof.

A further object of the present invention is to provide a double-layered core having a first layer of a closed cell cushioning material, and a second layer of a shock absorbing material fully enveloping the first layer. It certain embodiments, the double-layer core can be fully enveloped in a cover. Preferably, that cover is a flame-retardant material.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 impact absorption device for motor vehicle rear seat occupant
15 barrier
16 slot
20 base
21 planar portion
25 double layer core
25a first layer
25b second layer
30 flame retardant textile
35 grip
40 insert portion
45 transition portion
50a track
50b rail
52 pin
53 aperture
60 lower seating surface
65 rear seat
70 motor vehicle
75 normal seat occupier
80 side impact "s"
85 passenger door frame
90 passenger window frame
95 travel path "a"
96 height adjustment fastener

DETAILED DESCRIPTION OF THE PREFERRED EMBODIMENT

The best mode for carrying out the invention is presented in terms of its preferred and alternate embodiments, herein depicted within FIGS. 1 through 9. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

Figure 1:
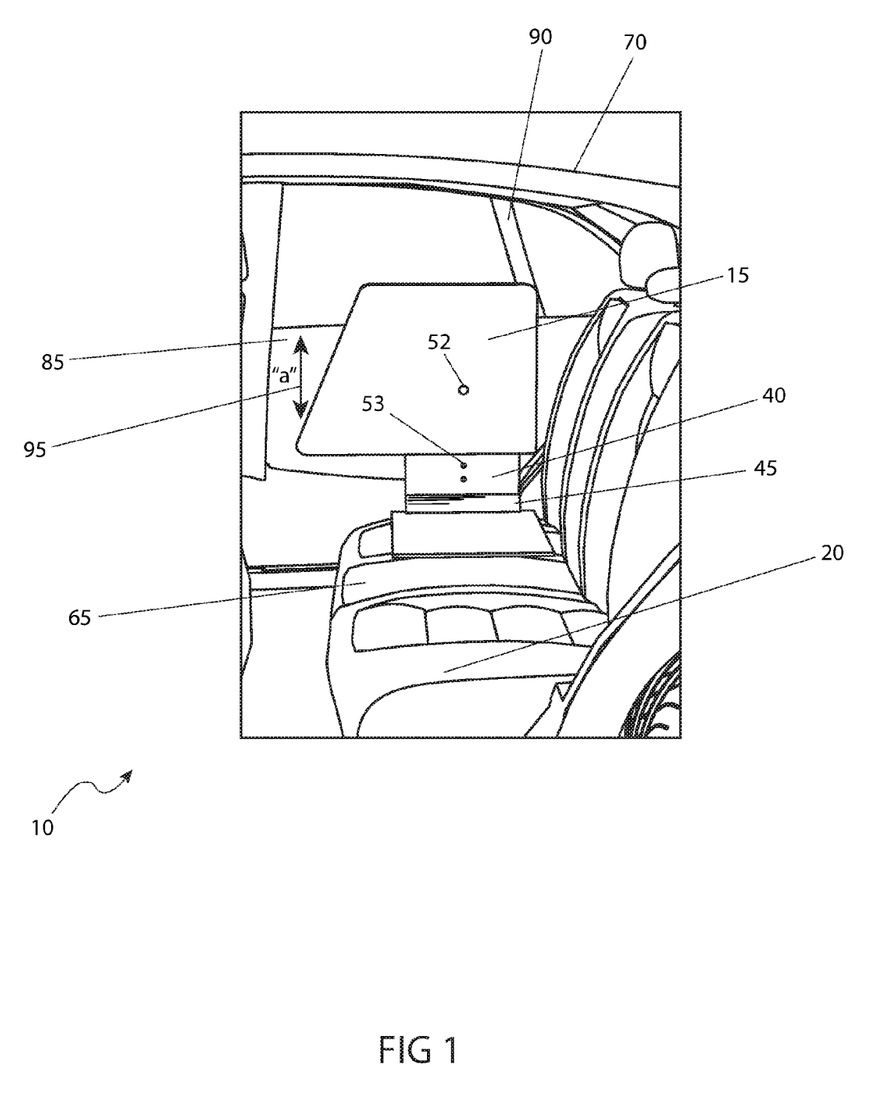
FIG. 1 is a perspective left side view of the impact absorption device 10, shown in an installed state in a motor vehicle 70, according to the preferred embodiment of the present invention.

Referring now to FIG. 1, a perspective environmental view of the impact absorption device 10 particularly suited for motor vehicle rear seat occupants 10, according to the preferred embodiment of the present invention, is disclosed. The impact absorption device for (herein described as the "device") 10, provides a shock absorbing cushioning barrier to aid in protecting back seat vehicle passengers from a side impact crash.

The device 10 comprises two (2) major components: a barrier 15 and a base 20. The base 20 is configured to be placed on a lower seating surface 60 of a rear seat 65 of a motor vehicle 70. The barrier 15 is capable of sliding over a portion of the base 20 and be secured thereto. The device 10 provides potential protection from severe injury in a passenger vehicle side impact. This view provides additional clarification on the positioning of the device 10 within the motor vehicle 70 and the subsequent advantages of injury reduction during a side impact from another vehicle or object. It should be noted that a high percentage of motor vehicles 70 have no side airbag for the rear passenger seats 65, however recent model vehicles 70 are increasingly being produced with rear curtain airbags.

It is envisioned that the device 10 will be produced in an alternate embodiment with a barrier 15 that is as high as the side of the passenger door frame 85 for a motor vehicle 70 equipped with a factory side or curtain air bags. In a motor vehicle 70 without factory-provided rear side curtain airbags, the barrier 15 would be provided in a height as high as top of the passenger window frame 90 for an increased level of protection. As such, the device 10 can be used in a motor vehicle 70 with or without factory-provided side or curtain air bags while providing an increased level of protection in either case. It should be noted that children or smaller adults, normally not tall enough to benefit from the impact protection of factory-provided side air bags or curtain bags will benefit from the teachings of the device 10.

Figure 2:
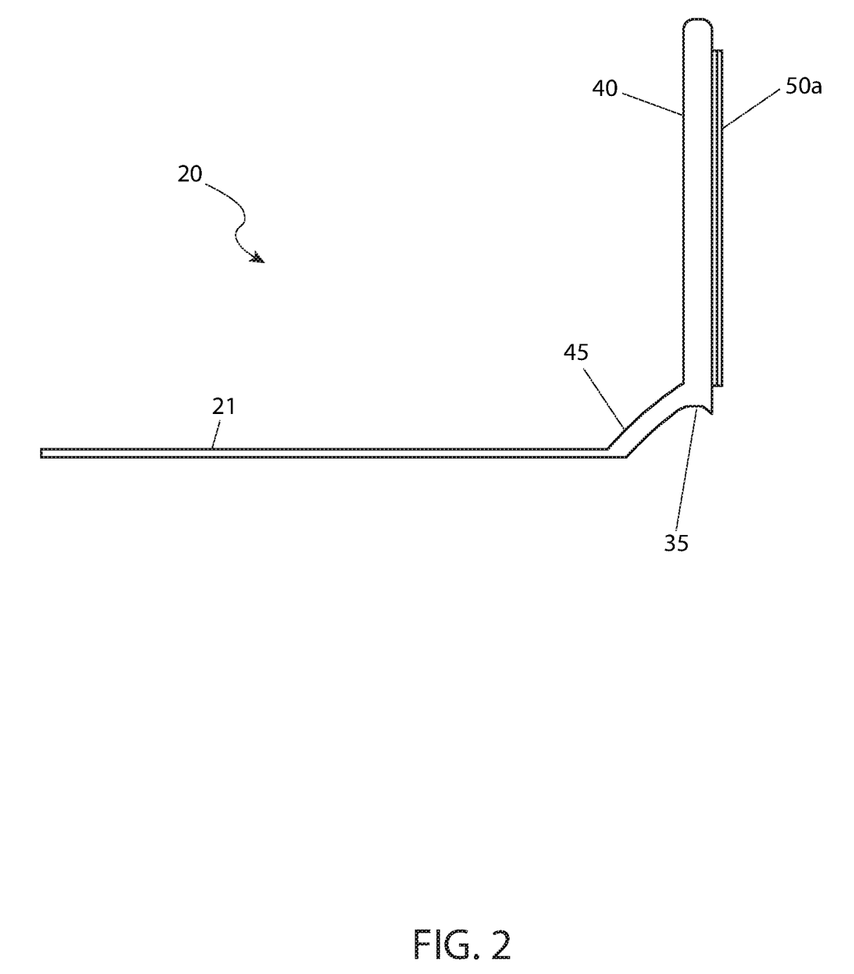
FIG. 2 is a side view of the base portion 20 of the impact absorption device 10, according to the preferred embodiment of the present invention.
Figure 3:
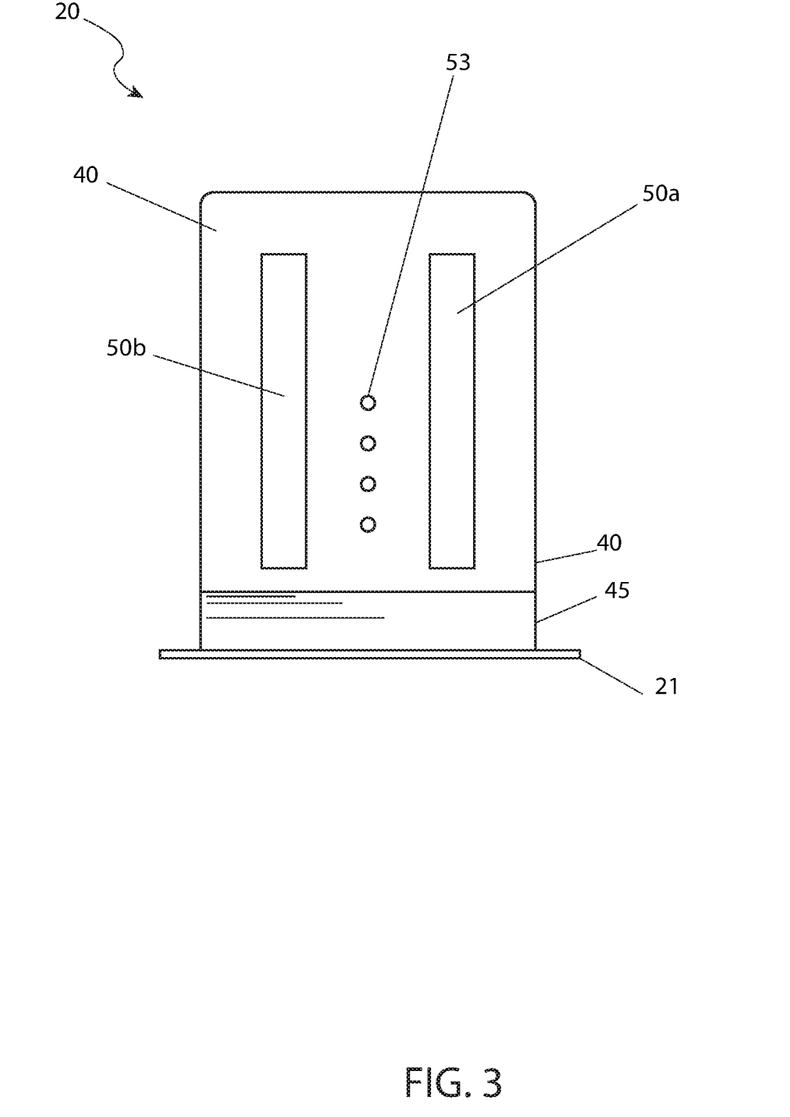
FIG. 3 is a front view of the base portion 20 of the impact absorption device 10, according to the preferred embodiment of the present invention.
Figure 4:
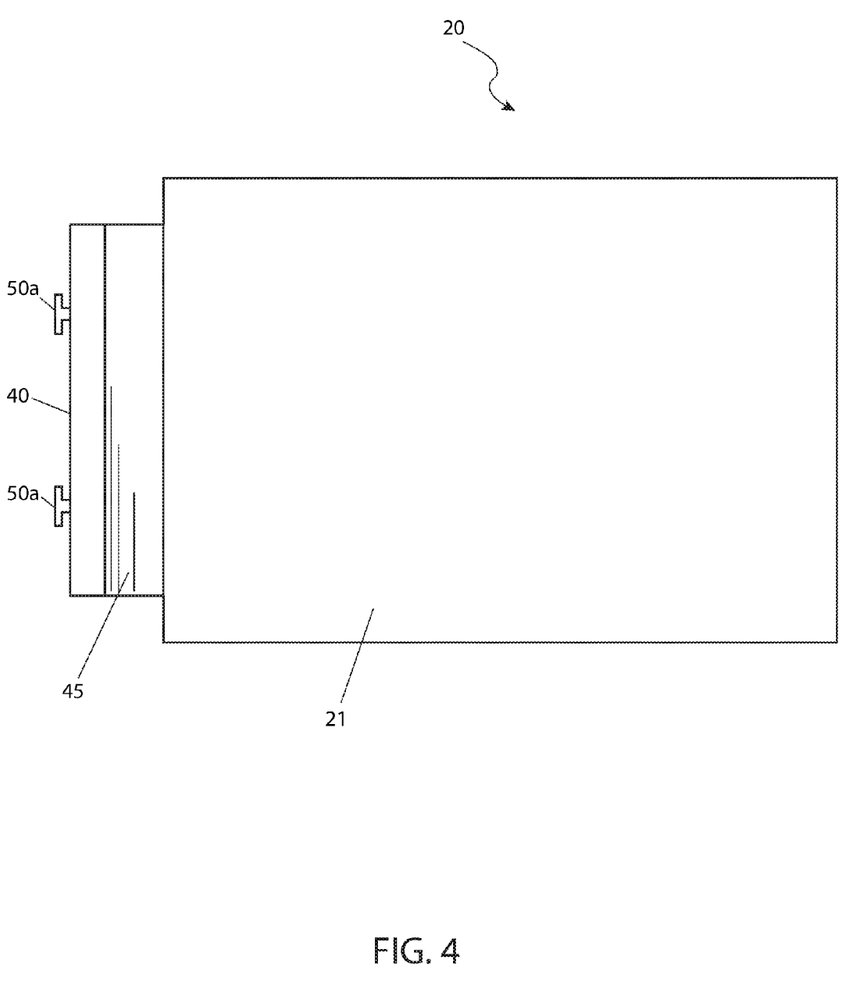
FIG. 4 is a top view of the base portion 20 of the impact absorption device 10, according to the preferred embodiment of the present invention.

Referring now to FIGS. 2-4, the base 20 includes a planar portion 21, a transition portion 45 having a front end gently curving rearwardly and vertically away from the planar portion 21, and an insert portion 40 extending vertically away from the rear end of the transition portion 45. The insert portion 40 is oriented perpendicular from the planar portion 21. The overall dimensions of the base 20 would vary per the exact model of device 10 constructed, but are envisioned to be approximately fourteen inches (14 in.) long, one-quarter inch (¼ in.) thick, and ten inches (10 in.) wide. The base 20 would be manufactured from rigid plastic. The barrier 15 is capable of removable securement to the base 20 in a manner to allow for adjustment capabilities and described below.

The planar portion 21 is capable of being placed on the lower seating surface 60 of the rear seat 65 of a motor vehicle 70. The transition portion 45 is arcuate and curves away from the planar portion 21 and is generally shaped as such in order to clear the raised portion commonly associated with the lower seating surface 60 of a rear seat 60 that is adjacent to the door frame 85. This transition portion 45 is generally two inches (2 in.) in length to account from the gap between the door frame 85 and that raised portion of the lower seating surface 60. The transition portion 45 is continuous with the rear edge of the planar portion 21 and has a width preferably one inch (1 in.) shorter than the planar portion 21 on each side. The rear under surface of the transition portion 45 has a continuous grip 35 coextensive with a width thereof. The grip 35 is fashioned as an upwardly curved groove capable of enabling a user to tuck their fingers therewithin and grasp the entire device 10 to either remove it or manipulate it in place.

The insert portion 40 has a bottom edge continuous with the rear edge of the transition portion 45 and coextensive with a width thereof. A pair of tracks 50a are located on a rear wall and are vertically aligned. The distance between the lower limit of the tracks 50a and the upper edge of the insert portion 40 is preferably nine inches (9 in.). These tracks 50a are capable of enabling a pair of rails 50b of the barrier 20 to slidably engage therewith (more discussion below). It is preferred that the pair of tracks 50a are equidistant from a bisecting axial centerline of the insert portion 40 and are generally "T"-shaped. Located along the aforementioned bisecting axial centerline is a plurality of apertures 53 positioned adjacent the bottom. Each aperture 53 is capable of receiving a securing a pin portion of a spring-loaded pin 52 of the barrier 15 such that a vertical height of the barrier 15 relative to the insert portion 40 is achieved.

Figure 5:
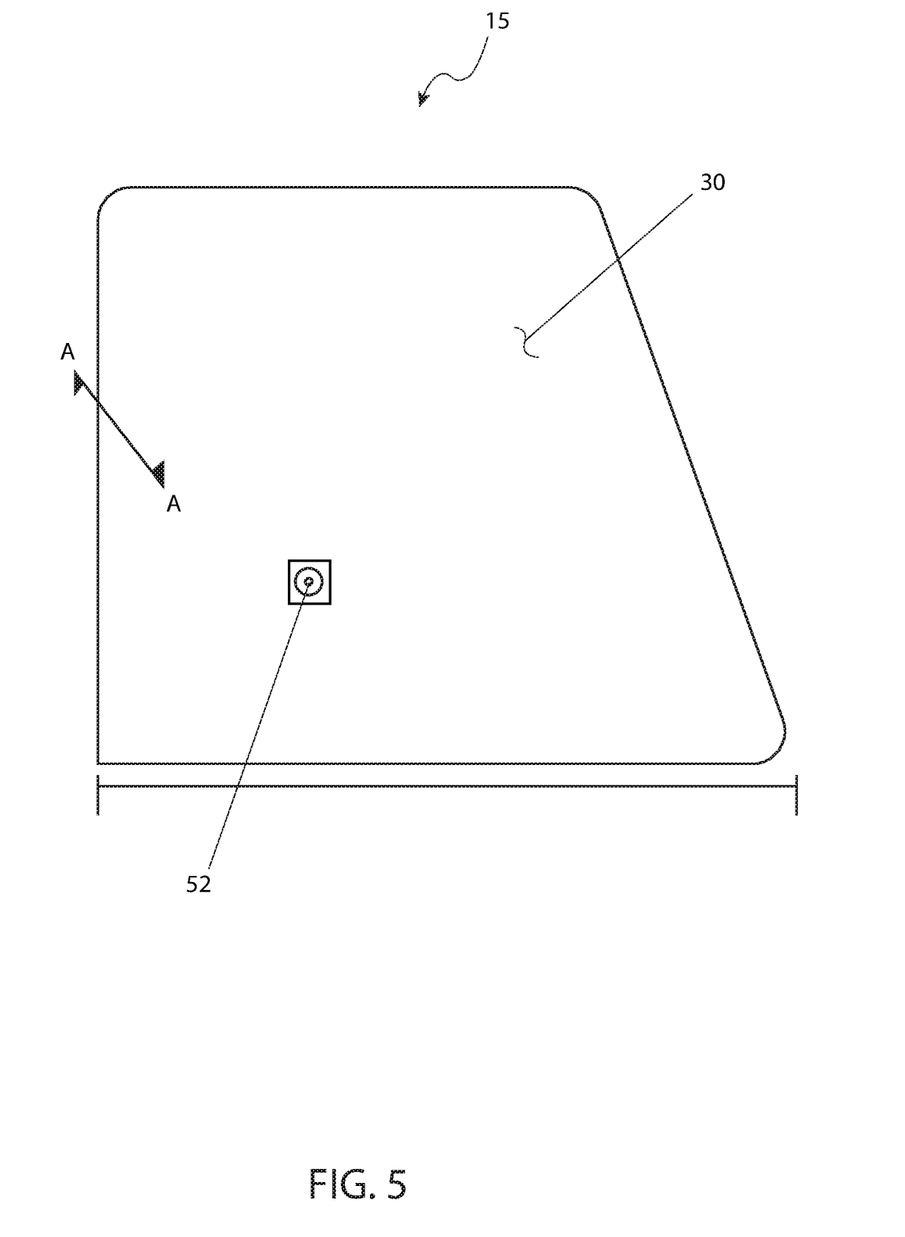
FIG. 5 is a front view of the barrier 15 of the impact absorption device 10, according to the preferred embodiment of the present invention.
Figure 6:
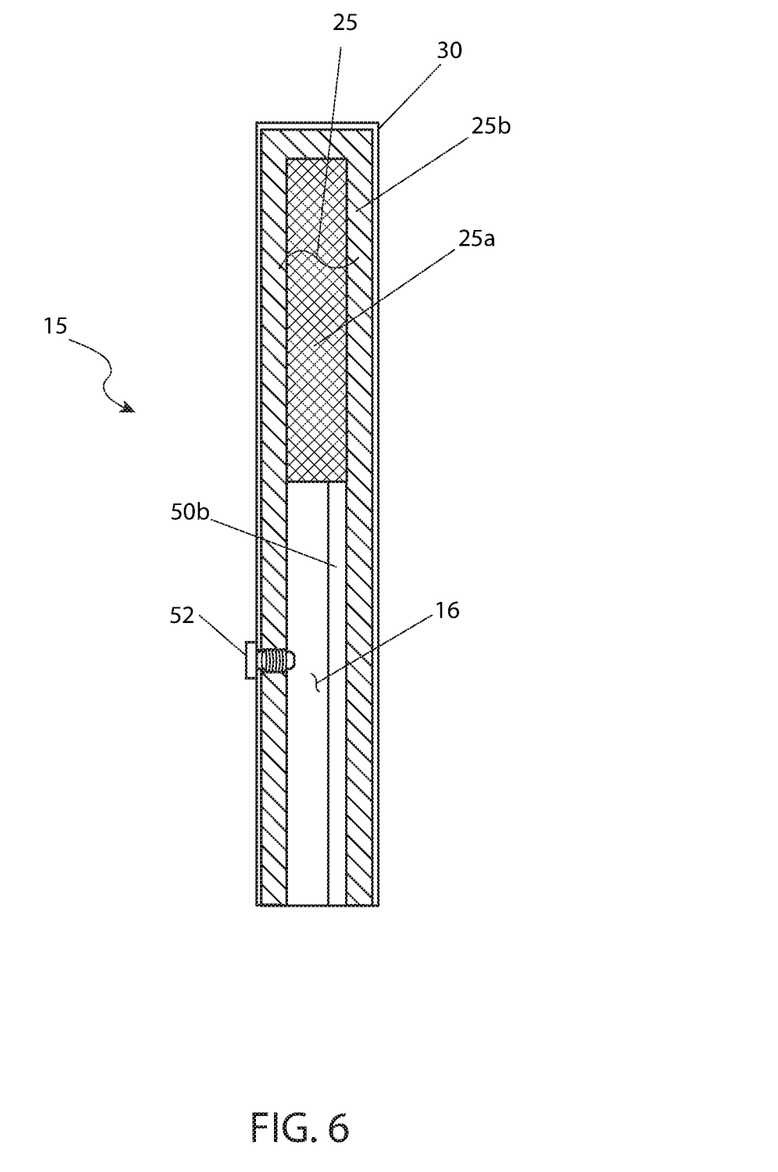
FIG. 6 is a sectional view taken along the line A-A of FIG. 1 of the barrier 15, according to the preferred embodiment of the present invention.
Figure 7:
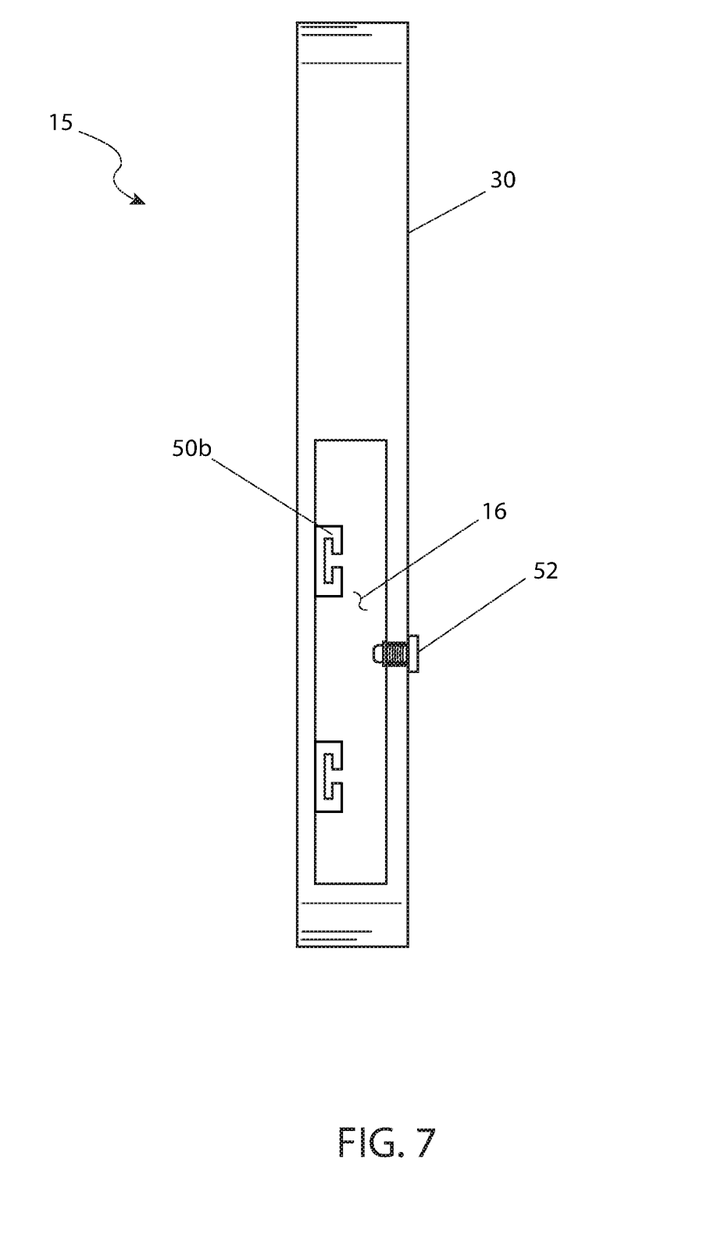
FIG. 7 is a bottom view of the barrier 15, according to the preferred embodiment of the present invention.

Referring now to FIGS. 5-7, the barrier 15 would vary in size per specific models but is envisioned to be typically sized at two inches (2 in.) thick, fourteen inches (14 in.) tall, and twelve to seventeen inches (12-17 in.) wide with a tapering configuration, similar in shape to a right trapezoid, having rounded corners. The barrier 15 has a top wall, a bottom wall with a slot 16 extending at least partially therewithin, a pair of side walls, a front wall, and a rear wall. The barrier 15 would be manufactured from a double layer core 25 with a first layer 25a of the core manufactured from a closed cell cushioning core for cushion during impact and to maintain the shape, surrounded by a second layer 25b comprising a shock absorbing material layer that has been demonstrated to absorb high impact. Such a second layer 25b can incorporate or entirely comprise materials such as 802SAM from 802 Solutions, LLC, Sorbothane®, D30™, or PORON®. Finally, the barrier 15 would be covered in a flame-retardant textile 30 for safety and durability. It is envisioned that the first layer 25a extends around the slot 16 portion.

The slot portion 16 of the barrier 15 has a thickness enabling full insertion of the insert portion 40, such that the bottom wall rests against the transition portion 45. Within the barrier 15, on the inner wall of the slot most adjacent to the rear wall of the barrier 15, are a pair of rails 50b, each capable of alignment with and travel over a respective one (1) of the pair of tracks 50a of the insert portion 40 of the base 20. With regards to the generally "T"-shape of each track 50a, each rail 50b is generally "C"-shaped to encompass and ride therealong.

Located central with respect to width of the slot 16, and closer to the bottom wall, is a spring-loaded pin 52 having a handle portion that is accessible from the front wall and a pin portion that is capable of extending through the front wall of the barrier 15 and into the slot 16. The pin 52 is biased such that the pin portion is in full extension within the slot 16. When the barrier 15 is placed on the insert portion 40 of the base 20, the pin portion of the pin 52 is aligned with the plurality of apertures 53 and is capable of engaging an individual aperture 53. When a force is applied to the pin 52 away from the barrier 15, the pin portion disengages the desired aperture 53 and a user can raise or lower the barrier 15 with respect to the insert portion 40 of the base 20 and relocate the barrier 15 with respect to the insert portion 40 of the base 20 at a desired height, then release the handle of the pin 52, thereby engaging the pin portion into a new aperture 53. The pin 52 has a stop to limit full removal from the barrier 15.

Figure 8:
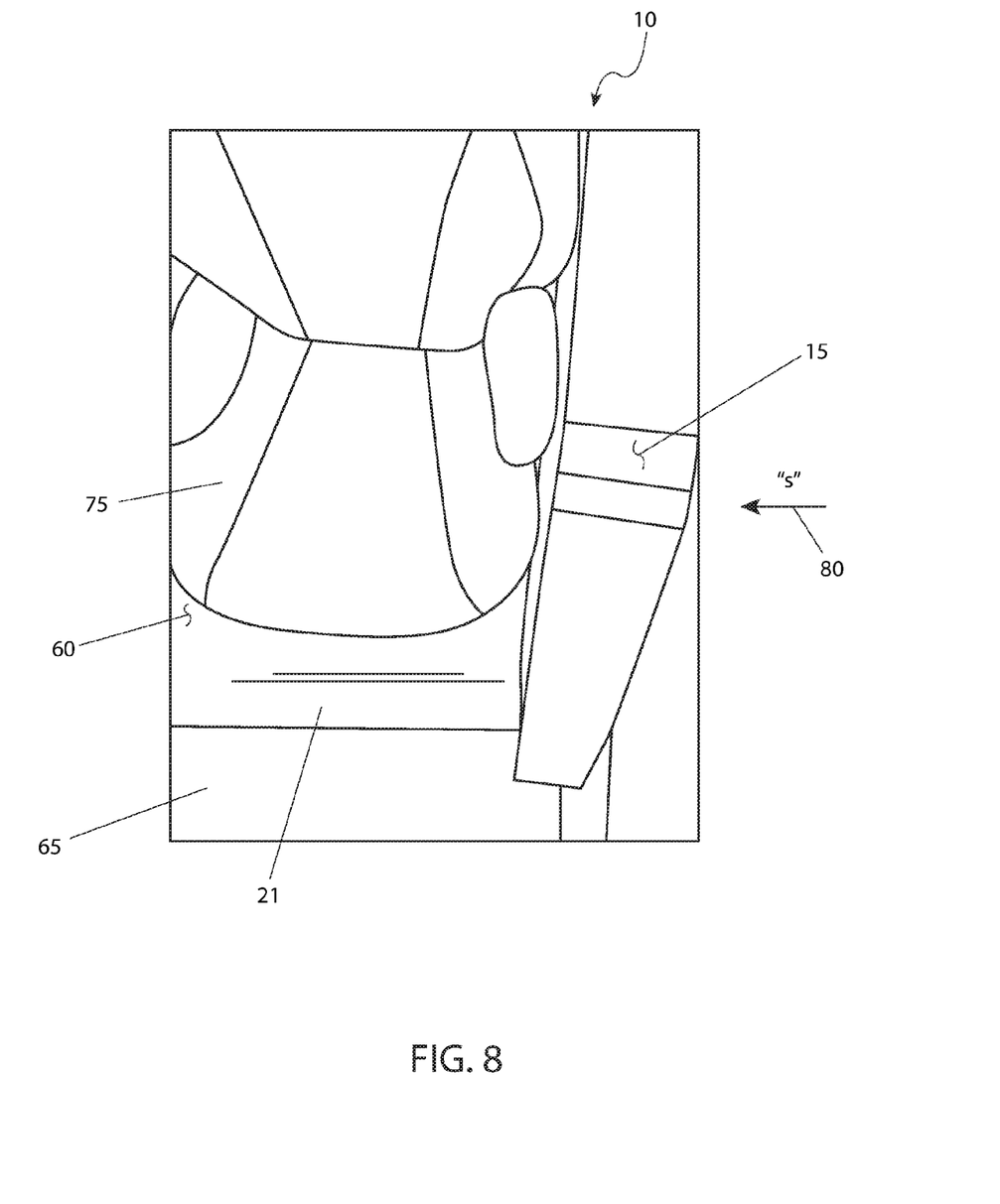
FIG. 8 is a perspective top view of the impact absorption device 10, shown in an installed state in a motor vehicle 70, according to the preferred embodiment of the present invention.

Referring now to FIG. 8, a perspective top view of the impact absorption device 10, shown in an installed state in a motor vehicle 70, according to the preferred embodiment of the present invention is shown. The barrier 15 is fastened to the base 20 as previously described in FIG. 1 and is prepositioned on a lower seating surface 60 of a rear seat 65 in a motor vehicle 70. The motor vehicle 70 is envisioned to be an automobile, truck, van, bus, sport utility vehicle (SUV) of any make, model, or year, due to the universal fit characteristics of the device 10. The base 20 is thus held in position by a normal seat occupier 75, here depicted as a child car seat. In actual usage, the normal seat occupier 75 could also be an actual full size adult passenger, a booster seat, a child carrier, an infant carrier or virtually any object or individual that would occupy a rear seat 65 in a motor vehicle 70 at any time. As shown in the proper position, the device 10 provides a shock absorbing cushion between the normal seat occupier 75 and a side impact "s" 80, thus providing a solution for cushioning or absorbing impacts in motor vehicles 70 without conventional side impact air bags and thereby reducing the severity of the impact.

Figure 9:
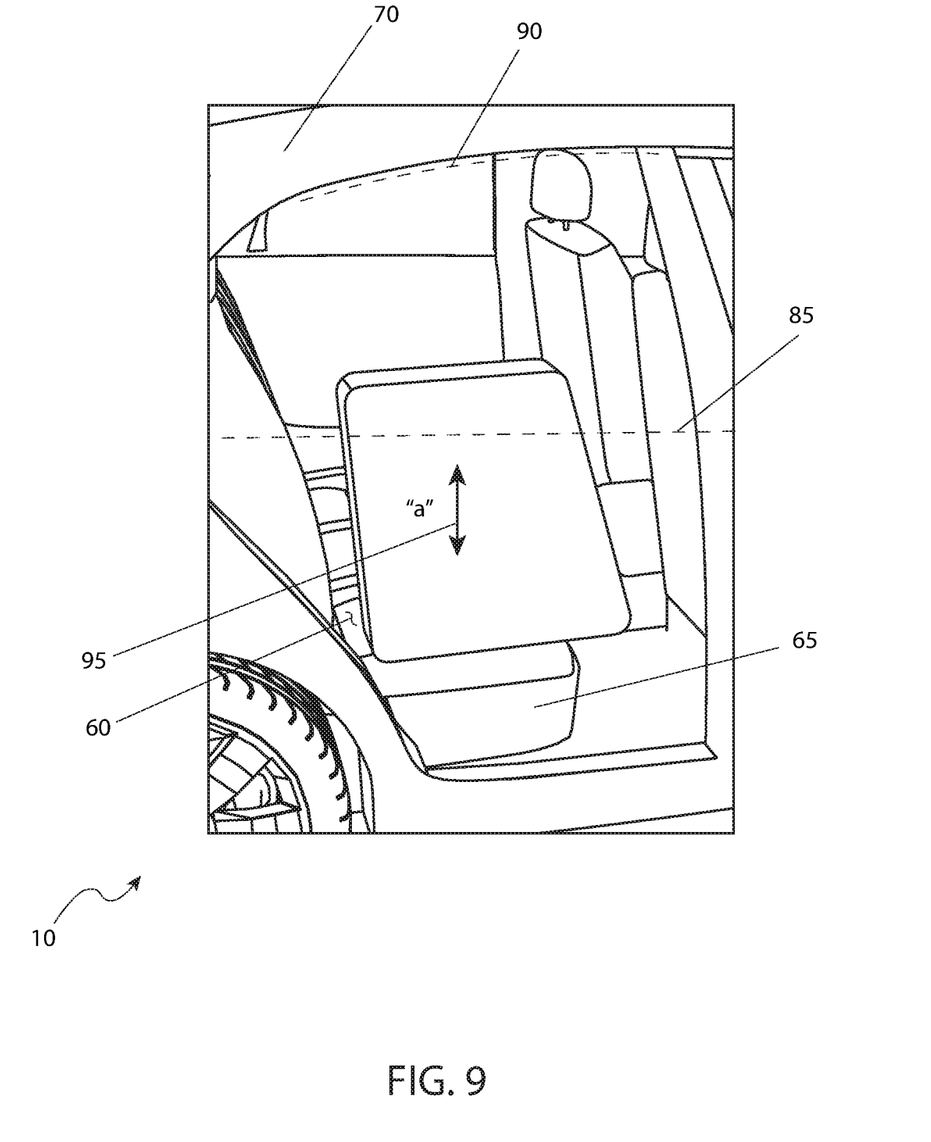
FIG. 9 is a perspective right side view of the impact absorption device 10, shown in an installed state in a motor vehicle 70, according to the preferred embodiment of the present invention.

Referring finally to FIG. 9, a perspective right side view of the impact absorption device 10, shown in an installed state in a motor vehicle 70, according to the preferred embodiment of the present invention is depicted. As aforementioned described, the base 20 is placed under a normal seat occupier 75 (not shown in this FIGURE for purposes of illustrative clarity) such as a passenger car seat, booster, carrier or child passenger. The distal end of the base 20 will extend outwards toward the door side of the normal seat occupier 75 (not shown in this FIGURE for purposes of illustrative clarity). This distal end provides for mounting of the barrier 15 as well as customization adjustments. The barrier 15 will be adjusted onto the base 20 so as to occupy the space between the normal seat occupier 75 (not shown in this FIGURE for purposes of illustrative clarity) and the passenger door frame 85. Upon side impact "s" 80 by another vehicle or object, the normal seat occupier 75 (not shown in this FIGURE for purposes of illustrative clarity) is likely to strike the barrier 15 and not the passenger door frame 85, thus, reducing the injury potential caused by directly impacting the passenger door frame 85 and/or passenger window frame 90. This could potentially protect the head and vital organs of children and others sitting in the rear of passenger vehicles. It should be noted that the device 10 is manufactured in different models for driver's side use and passenger side use, with the added option of being able to use the device 10 in between dual normal seat occupiers 75 (not shown in this FIGURE for purposes of illustrative clarity) (in a back-to-back configuration) as well for increased levels of physical protection. Some embodiments provide for full vertical adjustment of the barrier 15 relative to the insert portion 40 to reach the height of at least a normal seat occupier 75 approaching six feet (6 ft.) Other certain embodiments provide for full vertical adjustment of the barrier 15 relative to the insert portion 40 to reach the height of at least the upper portion of the passenger window frame 90.

The preferred embodiment of the present invention can be utilized by the common user in a simple and effortless manner with little or no training. It is envisioned that the impact absorption device for motor vehicle rear seat occupants 10 would be constructed in general accordance with FIG. 1 through FIG. 9. The device 10 would be utilized by drivers of motor vehicle 70 where an added element of protection for a rear seat 65 is desirable such as during a side impact "s" 80. Such impacts typically occur at a time when drivers have the least amount of control over the outcome, as likely in a stationary position while waiting for a light to change for example.

After procurement of the device 10, it would be adjusted to fit differing sizes of motor vehicle 70, rear seat 65, users, seating configurations or the like. Next, it would be positioned such that the base 20 is positioned on the lower seating surface 60 of the rear seat 65 and secured in place by use of a normal seat occupier 75 such as actual full size adult passenger, a booster seat, a child carrier, an infant carrier or virtually any object or individual. At this point in time, the device 10 is ready to be utilized.

During utilization of the device 10, it provides additional protection against accidental side impacts that occur to the motor vehicle 70. Under normal conditions (non-impact), the normal seat occupier 75 continues to function in a non-restricted manner without any noticeable effects inflicted by the presence of the device 10. During event conditions (side impact "s" 80), the normal seat occupier 75 initially impacts the barrier 15 whereupon the impact absorbing characteristics of the double layer core 25 reduce physical impact shock and likely results in an overall reduction of possible physical injury. The device 10 can be used in a repeating manner until physical damage to the internal structure occurs forcing necessary replacement.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An impact absorption device, comprising:
   a rigid base; comprising:
     a planar portion, having a First end and a second end;
     a transition portion having a first end continuous with a rear edge of said planar portion and extending rearwardly away therefrom a second end; and,
     an insert portion vertically extending away from said transition portion, having a bottom edge continuous with a second end of said transition section; and,
   a barrier, comprising a resilient double layer core capable of absorbing an impact and rebounding to maintain its original shape, further having a first barrier side, a second barrier side, a top side, a bottom side having a slot vertically extending therewith, said barrier vertically movable relative to said insert portion and adjustably attached to said insert portion via a fastening means;
   wherein said fastening means is capable of providing vertical adjustment of said barrier relative to said insert portion; and,
   wherein said planar portion is configured to be placed on a seat of a vehicle such that said insert portion is adjacent a door frame of said vehicle; and,
   wherein when said barrier is attached to said insert portion, said barrier is capable of vertically adjusting to at least a height of a seated occupant in said seat.

2. The device of claim 1, wherein said device further comprises:
   a pair of tracks each affixed to a first side of said insert portion and equidistant from a bisecting axial centerline, each vertically oriented;
   a pair of rails, each affixed to a rear wall of said slot and each vertically oriented; and;
   said fastening means further comprising:
     a plurality of apertures aligned along said bisecting axial centerline of said inset portion; and,
     a pin located on said barrier and passing through a first wall thereof, further having a handle located outside said first wall and a pin portion;
   wherein said pair of rails aligns with and slidably engages said pair of tracks when said insert portion resides in said slot of said barrier; and,
   wherein said pin portion is capable of being inserted within a desired one of said plurality of apertures when said insert portion resides within said slot of said barrier.

3. The device of claim 2, wherein each of said pair of tracks is generally T-shaped and each of said pair of rails is generally C-shaped.

4. The device of claim 2, wherein said pin is biased such that a terminal end of said pin portion fully resides within said slot.

5. The device of claim 2, further comprising a stop located within said slot and encircling said pin to limit removal of said pin from said barrier.

6. The device of claim 2, wherein said transition portion is an arcuate member.

7. The device of claim 6, wherein said transition portion further comprises a grip located continuous with a rear surface of said second end.

8. The device of claim 6, wherein said transition portion further comprises a grip located continuous with a rear surface of said second end.

9. The device of claim 2, wherein said double layer core further comprises:
   a first layer comprising a closed cell cushioning material; and,
   a second layer comprising a shock absorbing material fully enveloping said first layer.

10. The device of claim 9, further comprising a cover fully enveloping said double layer core.

11. The device of claim 10, wherein said cover is a flame-retardant textile.

12. An impact absorption device, comprising:
    a rigid base; comprising:
      a planar portion, having a first end and a second end;
      a transition portion having a first end continuous with a rear edge of said planar portion and extending rearwardly away therefrom a second end; and,
      an insert portion vertically extending away from said transition portion, having a bottom edge continuous with a second end of said transition section; and,
    a barrier, comprising a resilient double layer core capable of absorbing an impact and rebounding to maintain its original shape, further having a first barrier side, a second barrier side, a top side, a bottom side having a slot vertically extending therewith, said barrier vertically movable relative to said insert portion and adjustably attached to said insert portion via a fastening means;
    wherein said fastening means is capable of providing vertical adjustment of said barrier relative to said insert portion; and,
    wherein said planar portion is configured to be placed on a seat of a vehicle such that said insert portion is adjacent a door frame of said vehicle; and,
    wherein when said barrier is attached to said insert portion, said barrier is capable of vertically adjusting to at least a height of an upper portion of a window frame of said door frame of said vehicle.

13. The device of claim 12, wherein said device further comprises:
    a pair of tracks each affixed to a first side of said insert portion and equidistant from a bisecting axial centerline, each vertically oriented;

a pair of rails, each affixed to a rear wall of said slot and each vertically oriented; and;

said fastening means further comprising:

a plurality of apertures aligned along said bisecting axial centerline of said inset portion; and, a pin located on said barrier and passing through a first wall thereof, further having a handle located outside said first wall and a pin portion;

wherein said pair of rails aligns with and slidably engages said pair of tracks when said insert portion resides in said slot of said barrier; and, wherein said pin portion is capable of being inserted within a desired one of said plurality of apertures when said insert portion resides within said slot of said barrier.

14. The device of claim 13, wherein each of said pair of tracks is generally T-shaped and each of said pair of rails is generally C-shaped.

15. The device of claim 13, wherein said pin is biased such that a terminal end of said pin portion fully resides within said slot.

16. The device of claim 13, further comprising a stop located within said slot and encircling said pin to limit removal of said pin from said barrier.

17. The device of claim 16, wherein said transition portion is an arcuate member.

18. The device of claim 13, wherein said double layer core further comprises:

a first layer comprising a closed cell cushioning material; and, a second layer comprising a shock absorbing material fully enveloping said first layer.

19. The device of claim 18, further comprising a cover fully enveloping said double layer core.

20. The device of claim 19, wherein said cover is a flame-retardant textile.

* * * * *